United States Patent

[11] 3,550,524

| | | |
|---|---|---|
| [72] | Inventor | Ivan S. Brumagim<br>Warren, Pa. |
| [21] | Appl. No. | 669,782 |
| [22] | Filed | Sept. 22, 1967 |
| [45] | Patented | Dec. 29, 1970 |
| [73] | Assignee | Feed Processing Systems<br>Warren, Pa.<br>a Company |

[54] APPARATUS FOR TREATING RUMEN CONTENT
10 Claims, 4 Drawing Figs.

[52] U.S. Cl. .................................................. 99/235, 99/2

[51] Int. Cl. .................................................. A23k 1/10

[50] Field of Search .................................... 99/235, 249, 251, 2, 14

[56] References Cited
UNITED STATES PATENTS

| | | | |
|---|---|---|---|
| 1,929,856 | 10/1933 | Schlotterhose .............. | 99/235 |
| 3,263,592 | 8/1966 | Hickey ........................ | 99/235 |
| 3,440,949 | 4/1969 | Trussell ....................... | 99/235 |

*Primary Examiner*—Robert W. Jenkins
*Attorney*—Charles L. Lovercheck

ABSTRACT: In the process disclosed herein, paunch manure is treated by sterilizing, pressing liquid from the gross solids, and evaporating the liquid to concentrate the entrained solids, minerals, and other nutrients. Heat is recirculated with the exhaust steam from the evaporation stage of the process to the sterilizing phase. It is most important that the final separation of water from the material be accomplished by evaporation. This is because the material contains (1) so many extremely small and microscopic solid particles, and (2) such a large quantity of dissolved ingredients, neither of which can be economically separated from the water content except by evaporation. The liquid effluent from the press contains approximately half of the nutrients in the raw material; however, these nutrients are proteins, carbohydrates, vitamins and fat, all of which have many times more value per pound than the fiber and other solids removed by the press previous to the concentration and recycling of its liquid effluent. The removal of the gross solids from the material by the press produces a low viscosity effluent, containing only about 5 percent solids, by weight, from which a large volume of water can be evaporated without producing an excessively viscous concentrate. The evaporator has adequate burner capacity and heat transfer surface to provide the necessary B.t.u.'s to evaporate the required water content. The quantity and nature of the ingredients in the effluent, however, requires that the evaporator be provided with scraping blades to eliminate "baking on" of the concentrate on the heat transfer surfaces and good agitation of its content to promote rapid heat penetration therein.

INVENTOR.
IVAN S. BRUMAGIM

INVENTOR
IVAN S. BRUMAGIM

BY Charles L. Lovenduk
ATTORNEY

APPARATUS FOR TREATING RUMEN CONTENT

A preferred system combines the sterilizer and evaporator in such a manner that the ratio of the area of heating surface to the volume of the evaporator content is extraordinarily high, thereby providing rapid and uniform heat penetration into the content and thus insuring rapid evaporation without detriment to its valuable ingredients. This combination also eliminates a pump, considerable piping and a complete agitating unit with drive, all of which contributes to a compact and inexpensive installation.

The steam generated in the evaporator far exceeds that required to heat and sterilize the material. The excess is exhausted to the atmosphere or used otherwise in the packer's plant.

Sufficient steam pressure is permitted to build up in the evaporator to force the steam into and through the content of the sterilizer and also to force the concentrate through the narrow space between the bottom edge of the sterilizer shell and the bottom of the evaporator, where it mixes with the material in the bottom of the sterilizer.

The concentrate, which is a sticky combination of proteins and carbohydrates mixed with water, adheres to the fiber in the sterilized material and the great majority of it is extruded with the finished product and the remainder is expelled with the liquid effluent from the press and again recycled through the system.

Paunch manure, which hereinafter will be referred to as material, is the content of the rumen or first stomach of a ruminating animal, which, unlike other animals, has four stomachs instead of one. Common domestic animals of this family are cattle and sheep.

The rumen is a thick skinned sac of tough flesh, which is processed by the meat packer into a saleable product called tripe.

Presently, except in rare cases where all of the material is dumped into the sewers or streams, the packer conveys the material over shaking screens and drains only the liquid effluent therefrom into the sewer. Both the material and the liquid effluent from the screens are serious water pollutants, and both contain much valuable nutritional content.

The water saturated solids retained on the shaking screens are disposed of in several ways. Some of these solids are trucked to land fills and occasionally they are burned. The material burns with a slow smoldering flame, which creates an obnoxious air polluting smudge.

In a few cases, these saturated solids are trucked to cattle feeding lots where at least a part of the material is sterilized and fed to cattle. However, the exorbitant cost of trucking such water saturated solids and the large loss of valuable nutrients in the liquid effluent dumped into the sewers from this sterilizing process, makes this means of disposal uneconomical and fails to solve the problem of water pollution.

Laboratory analyses, on a dry basis, of the nutritional ingredients in the material compare favorably with published analyses of growing rations fed by successful cattle feeders. However, federal, state and local regulations prohibit its use as livestock feed except after pathogenic sterilization. In addition, the material is considered a contaminant to packing house products and facilities and the authorities regulate its handling through certain areas of the packer's plant. Furthermore, at a moisture content in excess of about 40 percent, the material is not palatable to cattle and deteriorates rapidly in storage.

In order, therefore, to convert this obnoxious air and water pollutant into a satisfactory livestock feed, it is necessary to (a) prevent the material from coming in contact with other products or facilities in the packing plant, (b) pathogenically sterilize the material, (c) dehydrate the material to the optimum moisture content required either for immediate feeding, storage or sale, and (d) prevent any liquid effluent from the processing system.

The fibrous and tacky nature of the material, because of its makeup of water, fiber, proteins, carbohydrates, fat and ash, especially when the water content drops below about 80 percent by weight, makes it extremely resistant to flow. It is, therefore, difficult if not impossible, to force sufficient heat into any sizeable mass of the material to accomplish either adequate sterilization or significant dehydration. Furthermore, because there is so little heat transfer into the mass, the material immediately in contact with the heating medium dries quickly and ignites. The resulting smoldering fire is difficult to quench and progresses slowly through the mass giving off an obnoxious air polluting smudge.

Dehydration by mechanical means, such as the screw press, produces a product which is palatable to cattle and easily stored. The screw press, however, does not sterilize the material. In addition, it produces a large volume of liquid effluent, which when dumped into the sewers becomes a serious water pollutant. Furthermore, the valuable nutrients contained therein are lost. These nutrients, which are very finely divided particles or dissolved ingredients, consist of approximately half of the total proteins and carbohydrates contained in the raw material.

In order to improve and perfect the prior art of sterilizing and dehydrating paunch manure, it is necessary to successfully cope with a number of separate problems: (a) government regulations, (b) the the physical and chemical characteristics of the material, and (c) the the specific conditions required for a satisfactory finished product.

There are four basic and necessarily successive processes in the system: (1) sterilization of the material by live steam permeation, (2) separation of fiber and other separable solids from the material's liquid content by mechanical means, such as a screw press, (3) concentration of the liquid content by evaporation, and (4) recycling of the concentrate through the system.

The sterilization of the material must be the first process step in order to insure that the finished product extruded from the screw press in the second process step is pathogenically sterile. This sterilization is easily and well accomplished by the permeation of the material by live steam which is available in considerable excess from the evaporation process. This means of sterilization prevents overheating, charring or ignition of the material, all of which are detrimental, if not completely destructive, to its valuable ingredients.

The process of separating the fiber and other separable solids from the material must precede the process of evaporation because the presence of these solids virtually prevents the use of evaporation to significantly lower its water content. This separation is preferably done in a screw press, which accomplishes three necessary functions: (1) partially, but adequately, dehydrates the sterilized material and extrudes the dehydrated effluent as finished product, (2) controls the percentage of moisture in the finished product by means of adjusting devices in the press, and (3) expels a liquid effluent, which is free from fiber and other separable solids, thereby making its evaporation and concentration easily accomplished in a properly designed evaporator without detriment to its solid or dissolved ingredients.

The prior art does not extend itself to the full recovery of the nutrients contained in these liquid effluents, especially those lost through the packer's shaking screens, and thereby fails to (a) salvage a major part of the valuable ingredients contained in the material, and (b) eliminate the air and water pollution emanating therefrom.

Therefore, the object of this invention is to provide an improved processing system for sterilizing and dehydrating paunch manure.

Another object of the invention is to provide a processing system in which the paunch manure is isolated from contact with other materials or facilities in the packer's plant, thereby eliminating any possibility of contamination.

Another object of this invention is to accomplish thorough sterilization of the paunch manure without detriment to the finished product.

Another object of this invention is to decrease the water in the paunch manure to the optimum required for its sale or other use with little, if any, loss of its nutritional ingredients.

Another object of this invention is to accomplish both sterilization and dehydration of the material without permitting any liquid or solid effluent from the processing system to be dumped into the sewers or streams.

Another object of this invention is to overcome the extraordinary resistance of the material to heat penetration and its extremely low ignition point, by using a novel succession of sterilizing and dehydrating methods, whereby (1) the material is sterilized by direct permeation of live steam, (2) its fiber and separable solid content are separated by mechanical means and extruded as finished product, (3) the liquid effluent from the separator is concentrated by evaporation, and (4) the concentrate is recycled through the system.

Another object of this invention is to provide a compact and inexpensive processing system, which can be readily be installed in either an existing or new packing house complex.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

Figure 1:
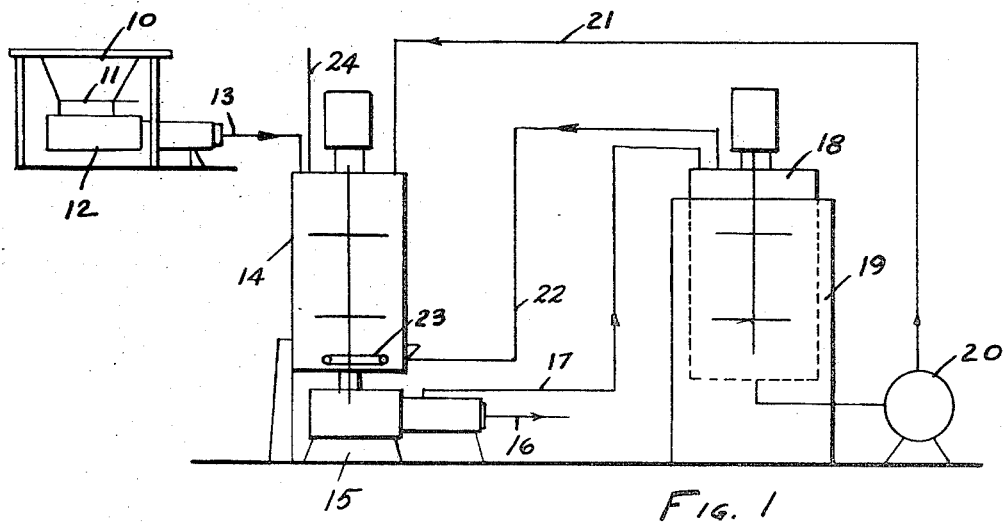
FIG. 1 is a schematic plan of the successive steps in the system.

Referring, now to the embodiment shown in the schematic plan view in FIG. 1, a paunch table 10 is shown, which is a facility of the packer's plant, on which the rumen from butchered animals is opened and its content washed into the inlet of a pump 12, which may be a "Moyno" pump. A hollow magnet 11 is inserted between paunch table 10 and pump 12 to pick up iron pieces often found in the material. A pressure tight pipeline 13 connects pump 12 to sterilizer 14. The sterilized material then enters directly into screw press 15 which separates the fiber and other separable solids from the material and extrudes them as finished product through outlet 16. The liquid effluent from separator 15 is forced through pressure tight pipeline 17 into the top of evaporator 18 where it is concentrated and the steam therefrom vented through pressure tight pipeline 22 into sparger 23 located in the bottom of sterilizer 14. From this point, the steam permeates upwardly heating and sterilizing the material. The excess is exhausted through outlet pipe 24 located in the top head of sterilizer 14. The concentrate from evaporator 18 passes through pump 20 into the top of sterilizer 14 where it mixes with the material and recycles through the system.

Figure 2:
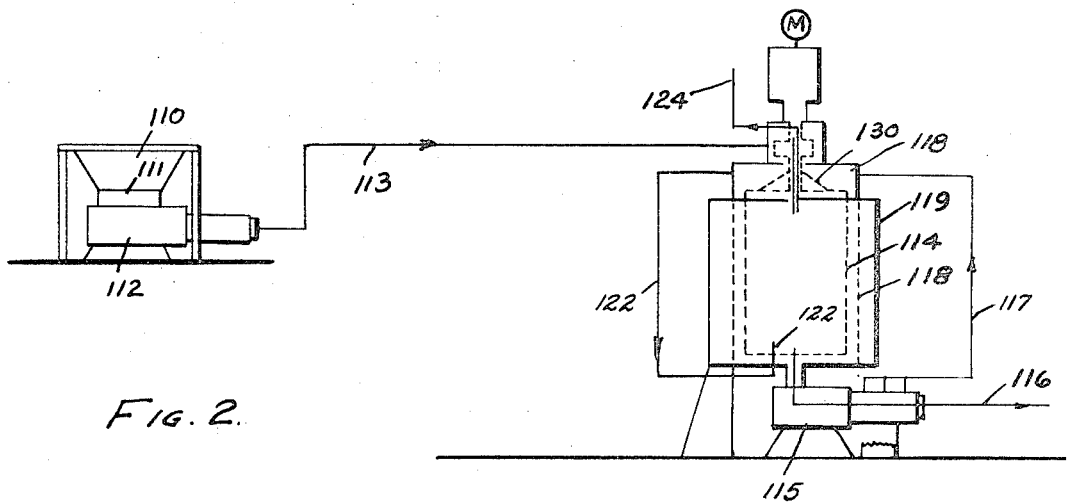
FIG. 2 is a schematic plan of the same successive steps with the processes of sterilization and evaporation accomplished in a single vessel in another embodiment of the invention.
Figure 3:
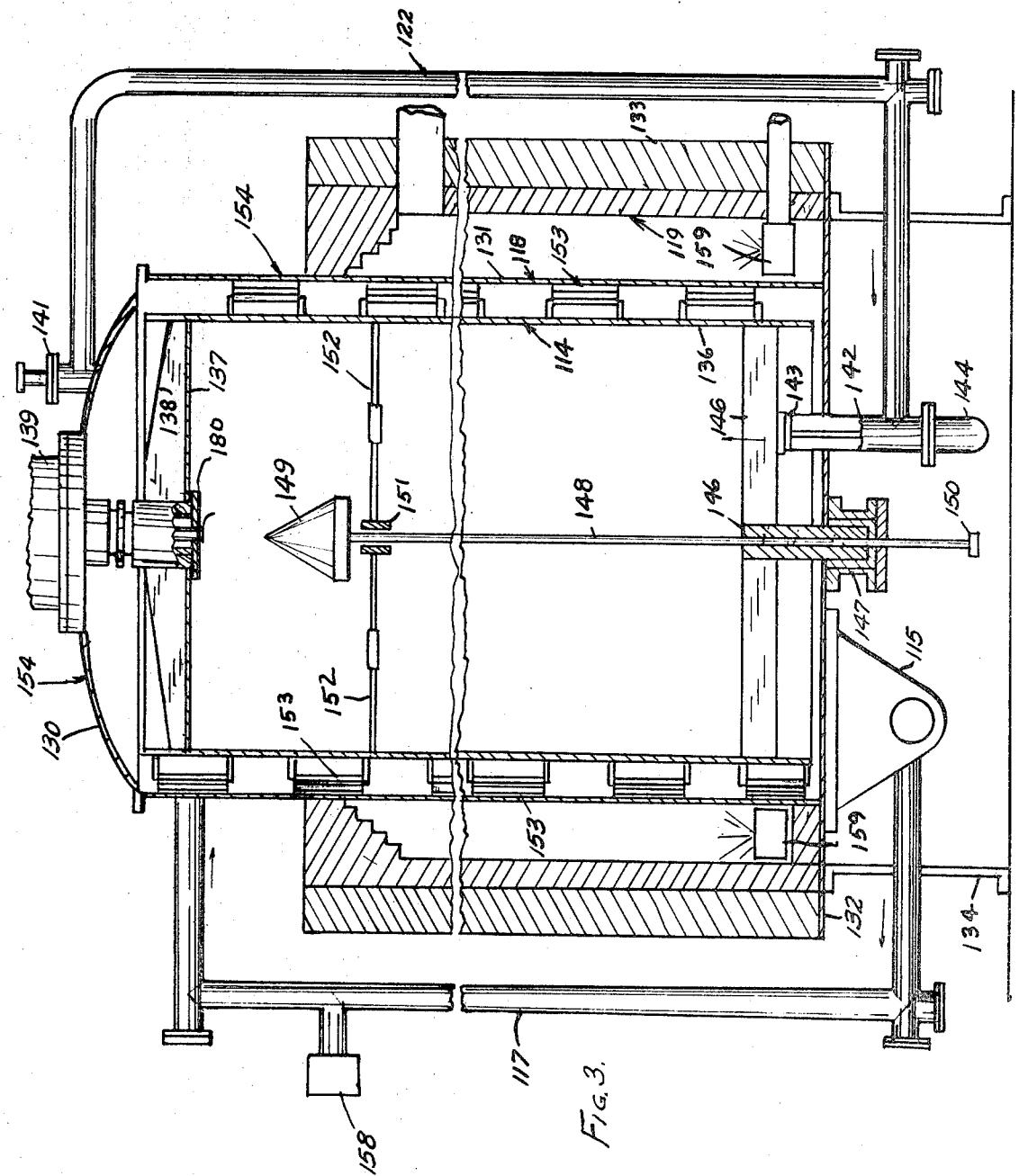
FIG. 3 is a cross-sectional view of the combined sterilizer and evaporator.
Figure 4:
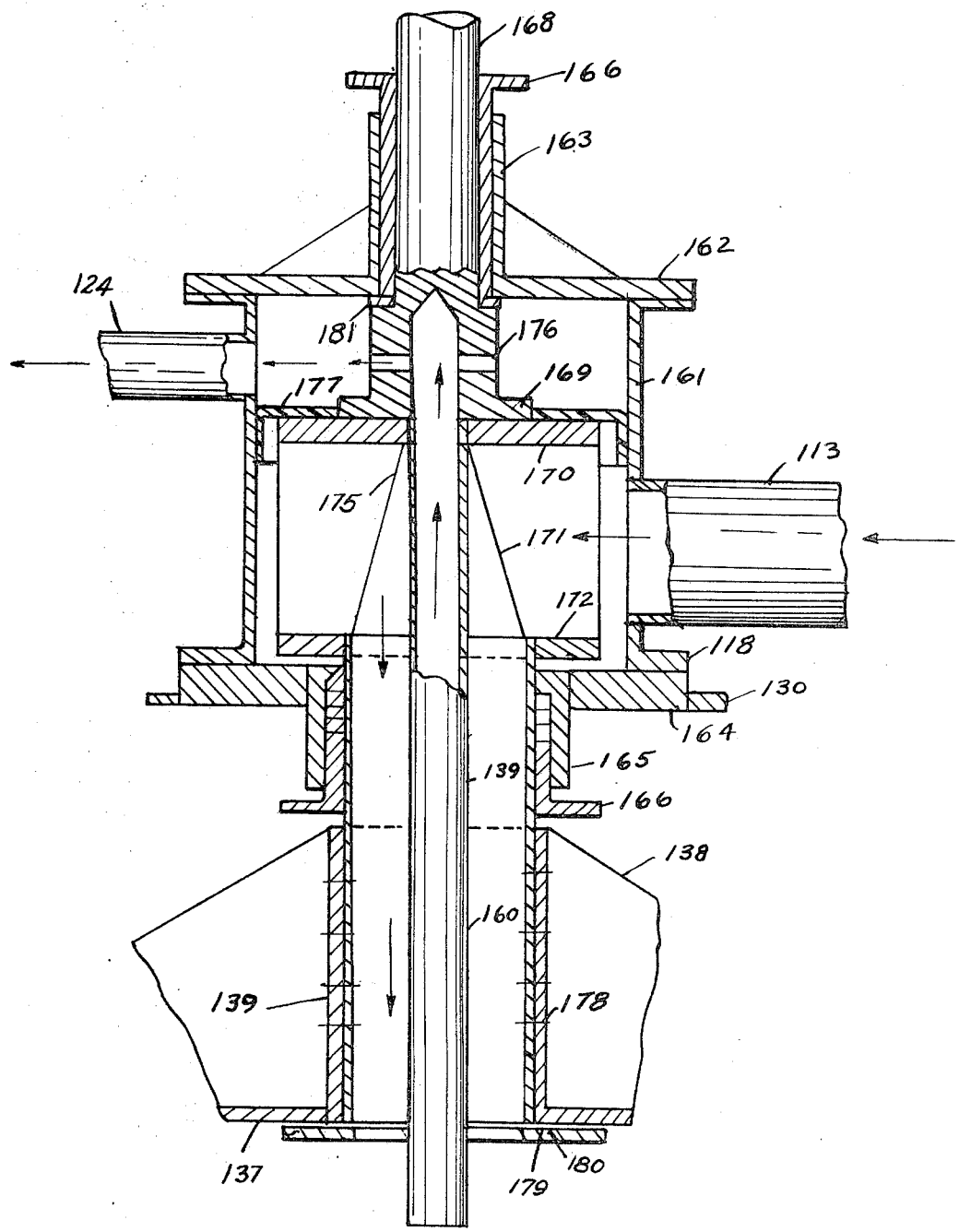
FIG. 4 is a cross-sectional view of a necessary torque transmitting rotary connection through which (a) steam is exhausted and (b) the material enters the sterilizer.

FIGS. 2, 3, and 4 show another embodiment of the invention. FIG. 2 outlines a preferred plan of the same successive steps of processing in which the sterilizer 114 and evaporator 118 are combined in a single vessel. As before, the material passes through paunch table 110, hollow magnet 111, and pump 112 through line 113. From pipeline 113, it is forced through the rotary connection, shown in FIG. 4, into sterilizer 114 which is an open ended inverted can 136 extended downward into and rotating within evaporator 118, with its open end located within a fraction of an inch from the bottom head of the evaporator. By this means the space occupied by the content of the evaporator 118 is restricted to that lying between the shell 136 and top head 137 of sterilizer 114 and the shell 131 and heads 130 of the evaporator 118. As before, the sterilized material drops into press 115 and the finished product is extruded through outlet 116, and the liquid effluent is forced through pipeline 117 into the top of evaporator 118. The steam generated in evaporator 118 is forced through pressure tight pipeline 122 into the bottom of rotating sterilizer 114. The steam permeates and sterilizes the material as before except its distribution through the material is enhanced by the overturning of the material produced by the rotation of the sterilizer 114. The excess of steam is exhausted at 124 through the rotary connection shown in FIG. 4. The concentrate from evaporator 118 is forced through the narrow space between the bottom head of the evaporator and the open bottom end of sterilizer 114, see directional line 121, where it mixes with the material and recycles through the system. In both the embodiment shown in FIG. 1 and the embodiment shown in FIG. 2—4, the heat for evaporation, which in turn supplies the steam for sterilization, is provided by furnace 19 and 119 respectively, in which evaporator 18 and 118 respectively is mounted.

Referring now, to FIG. 3, which is a cross-sectional view of the combined sterilizer and evaporator, the numeral 130 designates a dished head, which is bolted to a shell 131, which in turn is welded to a bottom head 132. Bottom head 132 extends radially outward to support furnace assembly 133. The overall structure is supported by cylinder 134. Parts 130 through 133 form the outer wall of the evaporator section of the combined unit 154.

Extended downward within shell 131 is an open ended can 136. Shell 136 is welded to a top head 137 which is reinforced as needed by radial ribs 138. The open end of shell 136 extends downward to within a fraction of an inch of bottom head 132. A rugged cylinder 139 is welded to top head 137 and ribs 138 thereby providing an inlet for the material, as well as the means of transmitting torque from the rotary connection, see FIG. 4, into the open ended can 136. Parts 136 through 139 form the inner wall of the evaporator section 118, as well as the periphery of the sterilizer section of the combined unit. The sterilizer section is designated by the numeral 114. Pipeline 122 is connected to top head 130 and connects to relief valve 141 and to valve 142, which is welded into bottom head 132. Valve 142 is close at its upper open end by spring loaded valve seat 143 and is flanged at its lower end for connection to valve spring adjusting mechanism 144.

By this means the steam generated in evaporator 118 is forced into sterilizer 114 where it is evenly distributed across the bottom of the material by the overturning action created therein by the rotation of the sterilizer 114. From here the steam permeates upward through the material to accomplish its sterilization. Excess steam is exhausted through pipe 15 160 to the rotary connection shown in FIG. 4 and exhaust 124.

Radial bars 145 are welded between shell 136 and hollow shaft 146, which extends downward into pressure tight bearing assembly 147 thereby providing the bottom radial and thrust bearings for the rotating sterilizer 114. Shaft 146 is hollow thereby permitting a movable rod 148 to reach upward through bearing assembly 147 from limit switch 150 to level control float 149. Immediately below control float 149 is a hollow cylinder bearing 151 held in place by three tie rods 152 which combine to provide the upper support for rod 148.

Attached by appropriate hinges to the outside of shell 136 are a multiplicity of hinged scraping blades 153 the leading edges of which, when the sterilizer 114 is rotated, are forced against against the heated shell 131 of the evaporator 118 thereby mechanically cleaning the shell surface, removing the heat therefrom and promoting rapid heat penetration into the evaporator content.

When the depth of material in sterilizer 114 reaches and raises float 149, limit switch 150 actuates screw press 115. The function of screw press 115 is to separate the sterilized material, extrude its solid content as finished product through outlet 116 and force its liquid content through pipeline 117 into the upper part of evaporator 118.

When the depth of liquid effluent in evaporator 118 reaches level control 158, burners 159 are automatically actuated bringing the temperature of the furnace 133 up to its operating temperature of about 750° F. The steam thus generated collects in the top of evaporator 118 and is forced through pipe line 122 and valve 142 into sterilizer 114. The concentrate from the evaporator 118 is forced through the narrow space between the open end of sterilizer shell 136 and evaporator bottom head 132 where it mixes with the material in the sterilizer and recycles through the system. The pressure in the evaporator, which need only be sufficient to force the steam and concentrate from the evaporator into the sterilizer, is controlled by pressure relief valve 141.

FIG. 4 is an enlarged cross-sectional view of a rotary connection, which transmits torque for the rotation of the sterilizer and provides inlet for material and outlet for steam. The pipeline 113 is welded into shell 161, which is provided with a bolted on cover 162, to which is welded stuffing box housing 163. The bottom flange of shell 161 is bolted to plate 164, which is an integral part of the evaporator top head shown as 130 in FIG. 3. A stuffing box housing 165 is welded into plate 164. Split glands 166 are provided for stuffing boxes 163 and 165. A steam outlet 124 is provided near the top of shell 161.

Shaft 168, which is driven by conventional means (not shown), passes through stuffing box 163, thrust bearing 181 and radial bearing 182, which combine to make up a pressure tight upper support assembly for the rotating sterilizer 114 in FIG. 3.

Shaft 168 is bolted by means of flange 169 to plate 170, which is the top member of an open, torque transmitting structure through which the material is forced and the steam exhausted. In addition to plate 170, the structure consists of four radial bars 171 welded along their top edges to plate 170 and along their bottom edges to plate 172. A relatively large pipe 173 is welded into plate 172, thereby continuing the channel through which the material is forced as well as the means of transmitting the torque necessary to rotate the sterilizer. Pipe 173 is pressure sealed by stuffing box 165.

A relatively small pipe 160 extends upward within cylinder 139 and is welded into plate 170 where it connects with counter bore 175 within shaft 168. A multiplicity of holes 176 provide outlet from counter bore 175 into the space enclosed by shell 161, from which pipe 124 exhausts to the atmosphere. By this means steam is vented from the rotating sterilizer.

A plastic or leather cup 177 attached to plate 170 prevents the material from being forced through steam exhaust pipe 124.

Radial through bolts 178 fix pipe 173 to the cylinder 139, which is an integral part of the sterilizer head 137, and transmits the torque for its rotation. This connection is made pressure tight by means of packing 179 and retaining plate 180.

By the use of the this pressure tight and novel sequence of processing functions, namely, (1) sterilization by direct steam permeation, (2) mechanical separation of fiber and other separable solids in the material from its liquid content, (3) concentration of the liquid content by evaporation of its water content, and (4) recycling the concentrate through the several processes, all combined in a compact and inexpensive processing system, which (a) isolates the material and thereby prevents its contamination of other products and facilities in the packer's plant, (b) pathogenically sterilizes but does not damage any of the ingredients in the material, (c) adequately dehydrates the material without the loss of any of its valuable ingredients, (4) produces no air or water polluting effluent and (5) is readily installed in or near the packer's new or existing plant, the several objects of this invention are accomplished.

It should be understood that the foregoing disclosure describes a specific embodiment of the invention and that numerous modifications and alterations may be made therein without departing from the spirit and scope of the invention as set forth in the following claims.

I claim:

1. A machine for converting the rumen content of a slaughtered ruminant into a useful product comprising:
    means on the machine to sterilize the said rumen content;
    means on the machine to connect it to said sterilizing means for mechanical separation of said content into its separable solids and its liquid content;
    means on the machine connected to means for mechanical separation for a subsequent concentration of said liquid content by evaporation;
    and means on the machine to recycle the said concentrate through said system.

2. The machine recited in claim 1 wherein said sterilizing means has means thereon to rotate it during the operation whereby its content is agitated.

3. The machine recited in claim 1 wherein pressure tight inlet means is provided on said machine comprising:
    a rotating mechanism;
    said rotating mechanism being connected to said sterilizing section whereby said sterilizing section is rotated.

4. The machine recited in claim 1 wherein steam exhaust means is provided to direct excess steam from said sterilizer section to an exhaust, said exhaust having means thereon to transmit torque for rotating said sterilizer.

5. The machine recited in claim 1 in which said sterilizer section occupies more than half of the unit's volumetric space.

6. The machine recited in claim 1 in which a multiplicity of hinged scraping blades are attached to the outside of the rotated sterilizer section shell, said blades being adapted to scrape an and clean the said shell and to agitate the contents of said shell.

7. The machine recited in claim 1 wherein means is provided to direct the steam from said evaporator into the bottom area of said sterilizer section.

8. A machine for treating rumen content comprising:
    a sterilizing chamber;
    an evaporator chamber;
    means connected to said sterilizing chamber to feed rumen content to said sterilizing chamber;
    means connecting said sterilizing chamber to said evaporator chamber;
    a mechanical dehydrator connected to said sterilizing chamber for receiving sterilized rumen content therefrom;
    said dehydrator having discharge means for discharging solids;
    means connecting said dehydrator to said evaporator chamber to conduct liquid removed from said solids to said evaporator chamber,
    heating means connected to said evaporator chamber for evaporating vapor from said liquid removed from said solids, and
    means to recirculate said vapor to said steriliziing chamber.

9. The machine recited in claim 8 wherein said sterilizing chamber is disposed inside said evaporator chamber.

10. The machine recited in claim 8 wherein means is connected to said evaporator chamber to return concentrate from said evaporator chamber to said sterilizing chamber.